US012682158B2

(12) United States Patent
Jain et al.

(10) Patent No.: US 12,682,158 B2
(45) Date of Patent: Jul. 14, 2026

(54) LABEL INDUCTION

(71) Applicant: ADOBE INC., San Jose, CA (US)

(72) Inventors: Rajiv Bhawanji Jain, Falls Church, VA (US); Michelle Yuan, Montclair, NJ (US); Vlad Ion Morariu, Potomac, MD (US); Ani Nenkova Nenkova, Philadelphia, PA (US); Smitha Bangalore Naresh, Sudbury, MA (US); Nikolaos Barmpalios, Palo Alto, CA (US); Ruchi Deshpande, Belmont, CA (US); Ruiyi Zhang, San Jose, CA (US); Jiuxiang Gu, Baltimore, MD (US); Varun Manjunatha, Newton, MA (US); Nedim Lipka, Campbell, CA (US); Andrew Marc Greene, Newton, MA (US)

(73) Assignee: ADOBE INC., San Jose, CA (US)

( * ) Notice: Subject to any disclaimer, the term of this patent is extended or adjusted under 35 U.S.C. 154(b) by 786 days.

(21) Appl. No.: 18/048,900

(22) Filed: Oct. 24, 2022

(65) Prior Publication Data

US 2024/0135096 A1    Apr. 25, 2024
US 2024/0232525 A9    Jul. 11, 2024

(51) Int. Cl.
*G06F 40/20* (2020.01)
*G06F 40/169* (2020.01)

(52) U.S. Cl.
CPC ............ *G06F 40/20* (2020.01); *G06F 40/169* (2020.01)

(58) Field of Classification Search
CPC ...... G06F 16/355; G06F 40/169; G06F 40/20; G06F 40/216; G06F 40/30; G06N 3/045; G06N 3/08
See application file for complete search history.

(56) References Cited

U.S. PATENT DOCUMENTS

| | | | | |
|---|---|---|---|---|
| 2019/0147336 A1* | 5/2019 | Yu | ......................... | G06F 18/214 |
| | | | | 706/15 |
| 2019/0310999 A1* | 10/2019 | Vanacker | ................ | G06F 16/93 |
| 2023/0419121 A1* | 12/2023 | Poms | ..................... | G06N 3/045 |
| 2024/0004889 A1* | 1/2024 | Kim | .................... | G06F 16/2462 |

OTHER PUBLICATIONS

Ren, et al., "A Survey of Deep Active Learning", ACM Computing Surveys (CSUR) 54.9 (2021): 1-40. https://www.xiaojun.ai/papers/DA-Survey.pdf, arXiv preprint: arXiv:submit/3314239 [cs.LG] Aug. 8, 2020, 29 pages.

(Continued)

*Primary Examiner* — Angela A Armstrong
(74) *Attorney, Agent, or Firm* — F. CHAU & ASSOCIATES, LLC

(57) ABSTRACT

Systems and methods for document classification are described. Embodiments of the present disclosure generate classification data for a plurality of samples using a neural network trained to identify a plurality of known classes; select a set of samples for annotation from the plurality of samples using an open-set metric based on the classification data, wherein the annotation includes an unknown class; and train the neural network to identify the unknown class based on the annotation of the set of samples.

18 Claims, 12 Drawing Sheets

What labels best describes what is shared and different between these document

(56) References Cited

OTHER PUBLICATIONS

Kalyanaraman, et al. "Bring your own model for Amazon SageMaker labeling workflows with active learning", Apr. 7, 2020, found on the internet at: https://aws.amazon.com/blogs/machine-learning/bring-your-own-model-for-amazon-sagemaker-labeling-workflows-with-active-learning/.

Prodigy. Radically efficient machine teaching. An annotation tool powered by active learning. Found on the internet at: https://prodi.gy/.

Blei, et al., "Topic Models", Text mining, Chapman and Hall/CRC, 2009. 101-124, http://machinelearningtext.pbworks.com/w/file/fetch/47924743/BleiLafferty2009.pdf.

Mei, et al., "Automatic Labeling of Multinomial Topic Models", Proceedings of the 13th ACM SIGKDD international conference on Knowledge discovery and data mining, 2007, 10 pages, http://www-personal.umich.edu/~qmei/pub/kdd07-label.pdf.

Carmel, et al., "Enhancing Cluster Labeling Using Wikipedia", Proceedings of the 32nd international ACM SIGIR conference on Research and development in information retrieval, 2009, pp. 139-146, http://184pc128.csie.ntnu.edu.tw/presentation/09-11-09/Enhancing%20Cluster%20Labeling%20Using%20Wikipedia.pdf.

Poursabzi-Sangdeh, et al., "ALTO: Active Learning with Topic Overviews for Speeding Label Induction and Document Labeling", Proceedings of the 54th Annual Meeting of the Association for Computational Linguistics (vol. 1: Long Papers), 2016, pp. 1158-1169, https://aclanthology.org/P16-1110.pdf.

Perera, et al., "Generative-discriminative Feature Representations for Open-set Recognition", Proceedings of the IEEE/CVF Conference on Computer Vision and Pattern Recognition, 2020, pp. 11814-11823, https://openaccess.thecvf.com/content_CVPR_2020/papers/Perera_Generative-Discriminative_Feature_Representations_for_Open-Set_Recognition_CVPR_2020_paper.pdf.

Geng, et al., "Recent Advances in Open Set Recognition: A Survey", IEEE transactions on pattern analysis and machine intelligence 43.10 (2020): 3614-3631, arXiv preprint: arXiv:1811.08581v4 [cs.LG] Mar. 21, 2020, https://arxiv.org/pdf/1811.08581.pdf.

Ning, et al., "Active Learning for Open-set Annotation", arXiv preprint arXiv:2201.06758v1 [cs.LG] Jan. 18, 2022, 9 pages, https://arxiv.org/pdf/2201.06758.pdf.

Brown, et al., "Language Models are Few-Shot Learners", Advances in neural information processing systems 33 (2020): 1877-1901, arXiv preprint: arXiv:2005.14165v4 [cs.CL] Jul. 22, 2020, https://arxiv.org/abs/2005.14165.

Wang, et al., "Automatic Multi-Label Prompting: Simple and Interpretable Few-Shot Classification", arXiv preprint arXiv:2204.06305v2 [cs.CL] Apr. 14, 2022, 10 pages, https://arxiv.org/pdf/2204.06305.pdf.

* cited by examiner

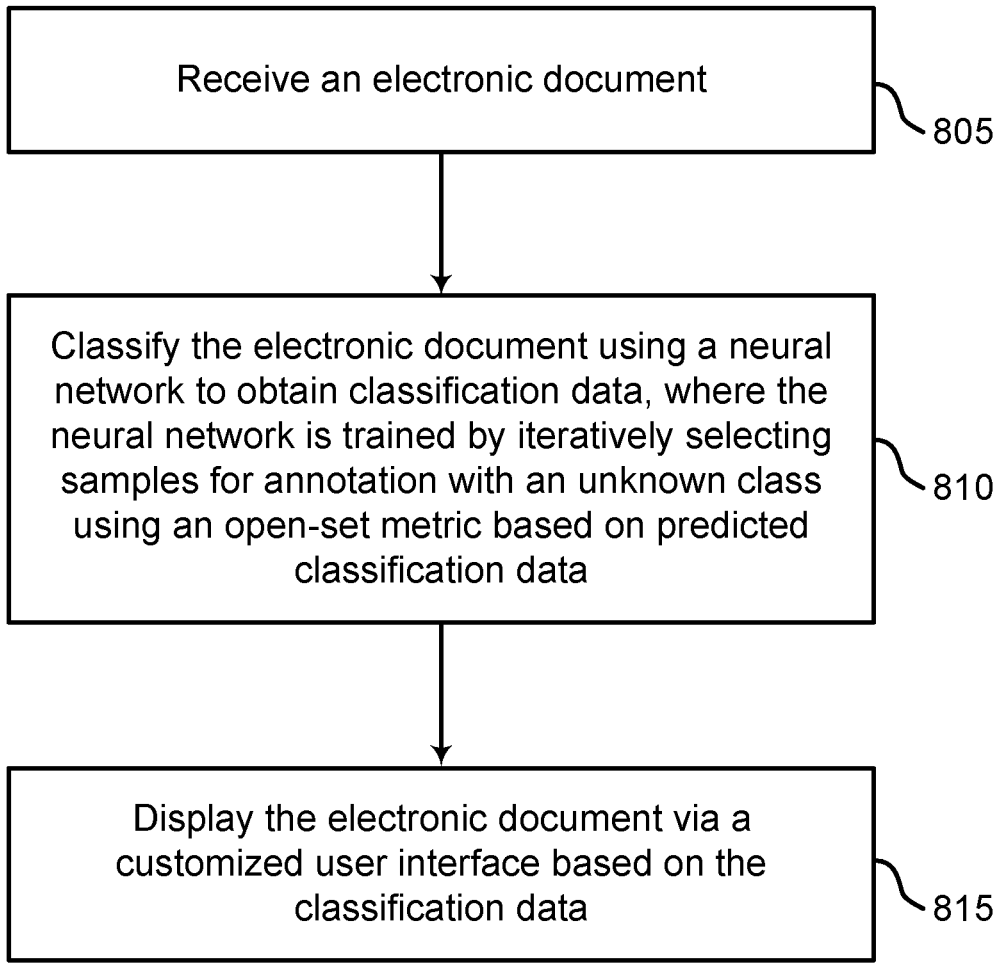

Receive an electronic document

805

Classify the electronic document using a neural network to obtain classification data, where the neural network is trained by iteratively selecting samples for annotation with an unknown class using an open-set metric based on predicted classification data

810

Display the electronic document via a customized user interface based on the classification data

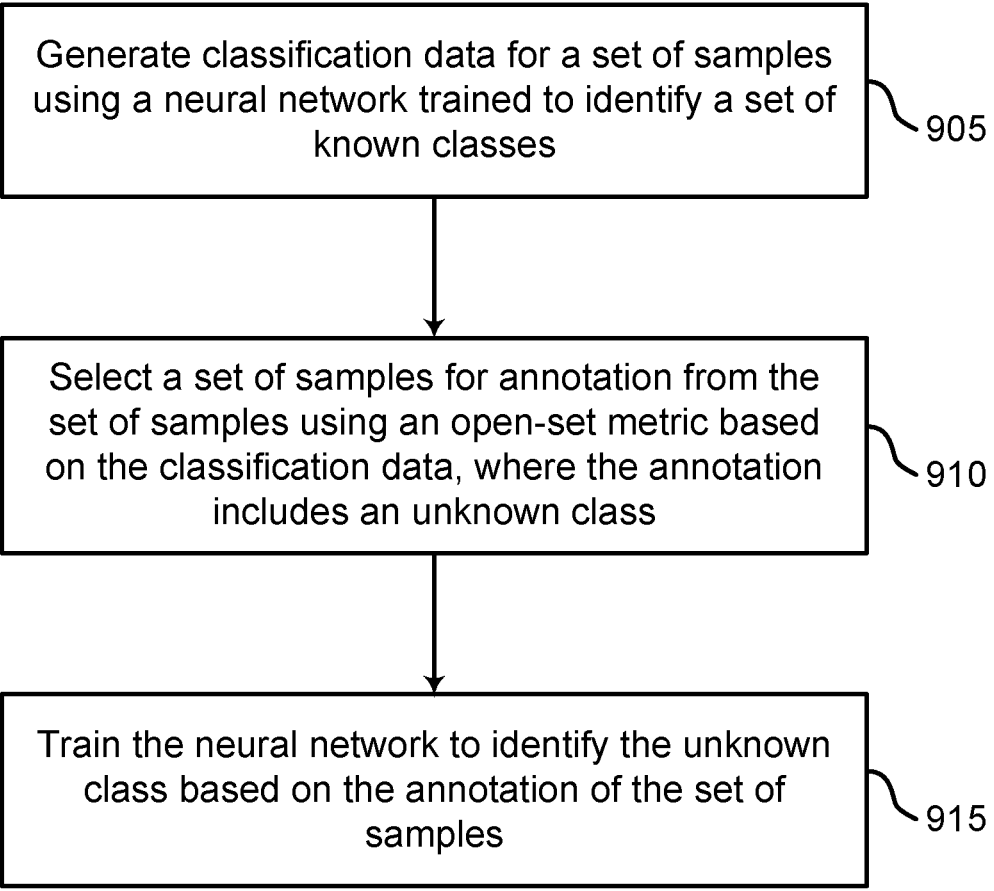

Generate classification data for a set of samples using a neural network trained to identify a set of known classes ⎬ 905

Select a set of samples for annotation from the set of samples using an open-set metric based on the classification data, where the annotation includes an unknown class ⎬ 910

Train the neural network to identify the unknown class based on the annotation of the set of samples ⎬ 915

FIG. 9

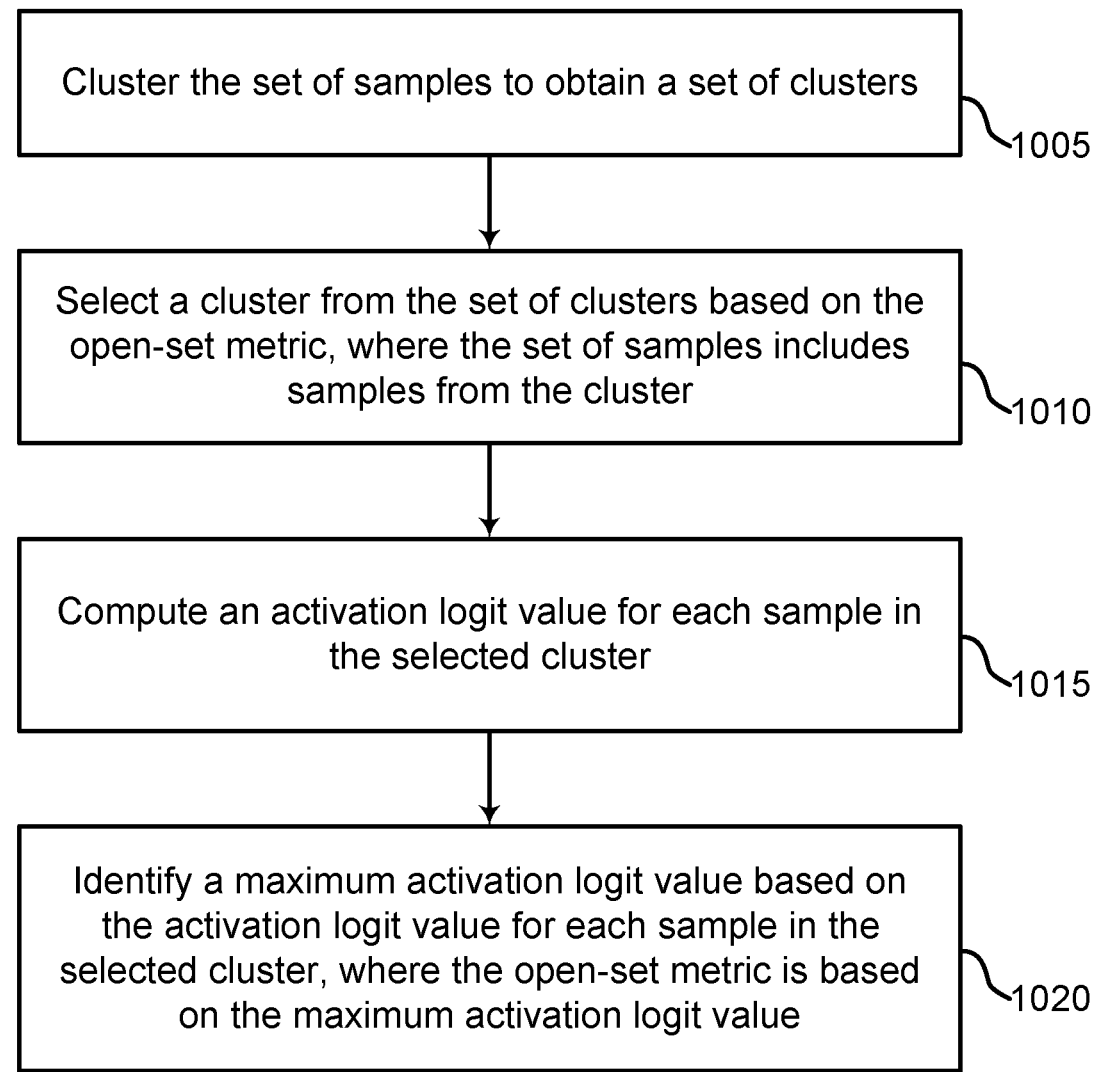

Cluster the set of samples to obtain a set of clusters
1005

Select a cluster from the set of clusters based on the open-set metric, where the set of samples includes samples from the cluster
1010

Compute an activation logit value for each sample in the selected cluster
1015

Identify a maximum activation logit value based on the activation logit value for each sample in the selected cluster, where the open-set metric is based on the maximum activation logit value
1020

FIG. 10

Identify a class of the set of known classes
~1105

Exclude the class from the set of known classes to obtain a reduced set of known classes
~1110

Compute the open-set metric based on the reduced set of known classes
~1115

LABEL INDUCTION

BACKGROUND

The following relates generally to natural language processing (NLP), and more specifically to document classification. NLP refers to using computers to interpret or generate natural language. In some cases, NLP tasks involve assigning label data such as grammatical information to words or phrases within a natural language expression. Some NLP systems use neural networks or statistical models which make soft, probabilistic decisions based on attaching real-valued weights to input features. These models can express the relative probability of multiple answers. Document classification is a field within NLP that involves assigning a document label to documents based on the content of the documents. Document classification depends on understanding document types and attributes. In some cases, multiple labels or tags may be assigned to one document (i.e., multi-label document classification).

However, conventional classification systems are limited to the number of document types that the classifiers are able to classify (e.g., 10 known document types maximum). But in real world practice, there are hundreds of document types. Conventional training methods cannot annotate data without knowing the label space. Therefore, there is a need in the art for an improved document classification system that can efficiently manage unknown labels.

SUMMARY

The present disclosure describes systems and methods for document classification. Embodiments of the present disclosure include a document classification apparatus configured to classify an electronic document using a neural network to obtain classification data. The neural network is trained by iteratively selecting samples for annotation with an unknown class using an open-set metric based on predicted classification data. A training component is configured to select a set of samples for annotation using the open-set metric that identifies ambiguous samples. For example, one label induction method relates to picking samples that have the least activation responses to all known classes. The training component identifies these samples and these samples are annotated with a previously unknown class. This enables a robust multi-label classifier that can handle a larger number of labels. In some cases, the document classification apparatus can be used in document classification tasks (e.g., PDF documents are displayed in a customized interface based on the document type). In some examples, users can retrieve documents from database by filtering based on document types.

A method, apparatus, and non-transitory computer readable medium for document classification are described. One or more embodiments of the method, apparatus, and non-transitory computer readable medium include receiving an electronic document; classifying the electronic document using a neural network to obtain classification data, wherein the neural network is trained by iteratively selecting samples for annotation with an unknown class using an open-set metric based on predicted classification data; and displaying the electronic document via a customized user interface based on the classification data.

A method, apparatus, and non-transitory computer readable medium for document classification are described. One or more embodiments of the method, apparatus, and non-transitory computer readable medium include generating classification data for a plurality of samples using a neural network trained to identify a plurality of known classes; selecting a set of samples for annotation from the plurality of samples using an open-set metric based on the classification data, wherein the annotation includes an unknown class; and training the neural network to identify the unknown class based on the annotation of the set of samples.

An apparatus and method for document classification are described. One or more embodiments of the apparatus and method include a processor; a memory including instructions executable by the processor; a neural network trained to identify a plurality of known classes for a plurality of samples; a clustering component configured to cluster the plurality of samples to obtain a plurality of clusters; and an open-set metric component configured to identify a cluster of the plurality of clusters for annotation based on an open-set metric.

BRIEF DESCRIPTION OF THE DRAWINGS

FIG. 8 shows an example of a method for document classification according to aspects of the present disclosure.

FIG. 9 shows an example of a method for training a neural network according to aspects of the present disclosure.

FIGS. 10 and 11 show examples of methods for computing an open-set metric according to aspects of the present disclosure.

DETAILED DESCRIPTION

Figure 1:
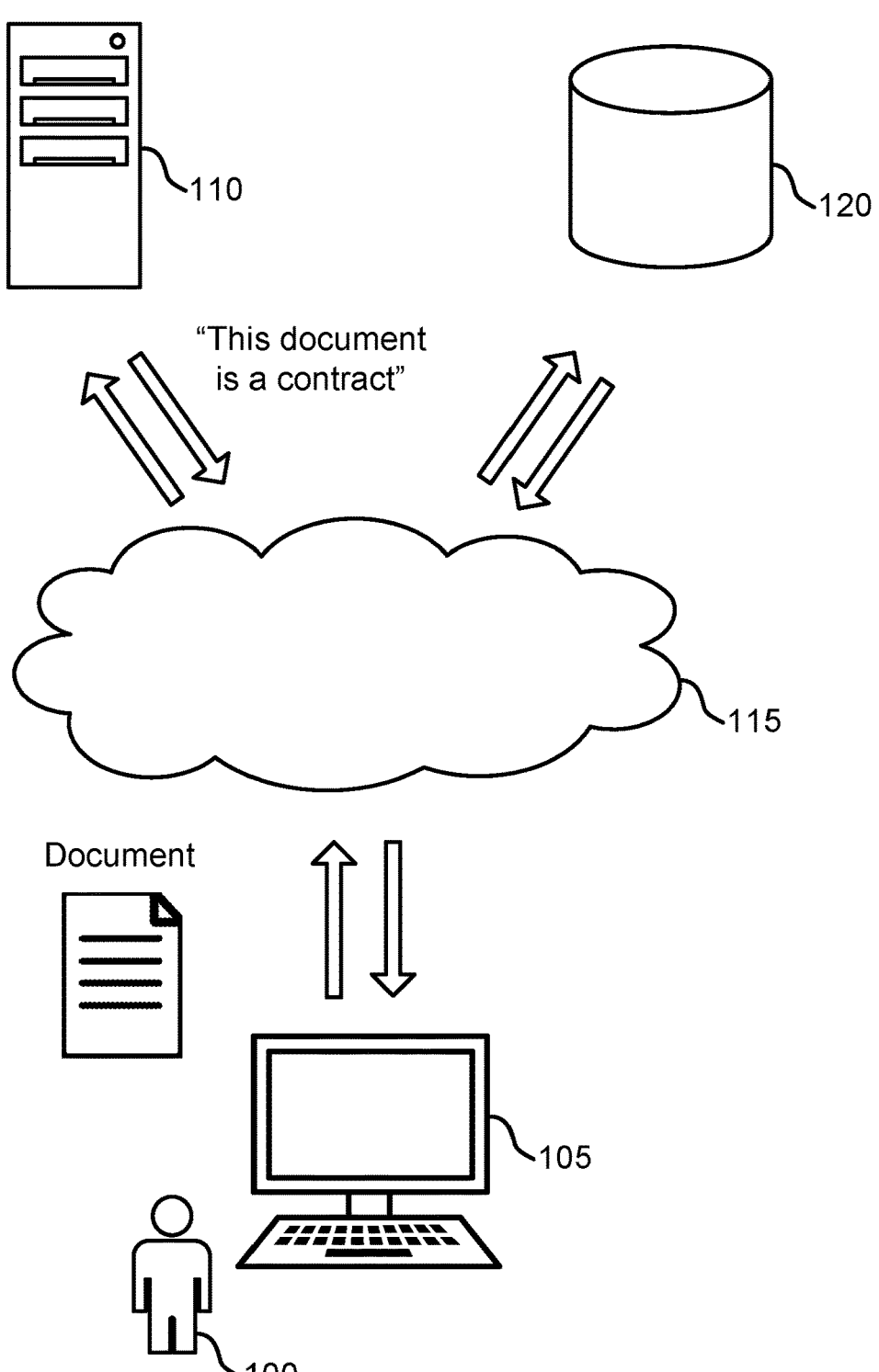
FIG. 1 shows an example of a document classification system according to aspects of the present disclosure.

The present disclosure describes systems and methods for document classification. Embodiments of the present disclosure include a document classification apparatus configured to classify an electronic document using a neural network to obtain classification data. The neural network is trained by iteratively selecting samples for annotation with an unknown class using an open-set metric based on predicted classification data. A training component is configured to select a set of samples for annotation using the open-set metric that identifies ambiguous samples. For example, one label induction method relates to picking samples that have the least activation responses to all known classes. The training component identifies these samples and these samples are annotated with a previously unknown class. This enables a robust multi-label classifier that can handle a larger number of labels. In some cases, the document classification apparatus can be used in document classification tasks (e.g., PDF documents are displayed in a customized interface based on the document type). In some examples, users can retrieve documents from database by filtering based on document types.

Recently, active learning and topic modeling are used for NLP tasks. Active learning relates to incorporating human interactions in the active learning loop to improve classifiers rapidly. Unsupervised learning techniques such as topic modeling or cluster labeling relate to partition a space of unlabeled documents into meaningful clusters and then assign meaningful labels to them. Active learning treats label space as static and known ahead of time (i.e., label space is known a priori), but in many cases, labels to be predicted are unknown at the beginning. Furthermore, conventional classification systems are limited to predict a predetermined number of document types and the size of class types is small (e.g., 10 class types for prediction). Thus, conventional classification systems are not sufficient to represent the variety of PDF documents (e.g., different categories and subclasses of documents).

Embodiments of the present disclosure include a document classification apparatus configured to classify an electronic document using a neural network to obtain classification data. The neural network is trained by iteratively selecting samples for annotation with an unknown class using an open-set metric based on predicted classification data. A training component is configured to train a machine learning model for document classification. In some examples, PDF documents are displayed in a customized user interface based on classification data generated by the neural network (e.g., document type).

In some embodiments, the training component selects a set of samples for annotation using an open-set metric that identifies ambiguous samples. For example, one label induction method relates to picking samples that have least activation responses to all known classes. The training component identifies these samples to be annotated with a previously unknown class. In some examples, the open-set metric indicates that the set of known classes do not characterize the set of samples to a threshold level. This enables a robust multi-label classifier that can handle a much larger pool of labels.

Some embodiments of the present disclosure can construct a multi-label dataset by efficiently sampling data for an annotator (e.g., a human) to label and induce new classes in the label space. In one example, the training component randomly samples one hundred documents and annotates these sampled documents according to an initial set of classes (e.g., initial 10 classes). The training component selects five known classes and labels the one hundred documents for each class. The training component chooses five clusters of the one hundred documents and induces a new label for each cluster. The neural network is trained on the labeled data. The steps involving sampling data for known classes and sampling data to induce unknown classes may be repeated for, for example, fifty cycles.

Some embodiments of the present disclosure relate to multi-label settings with hierarchical labels using top-down iterative class expansion (i.e., not limited to flat hierarchy). After running the current classifier for labeled classes on an unlabeled dataset, a user can choose the class with the largest number of predicted samples and run the label induction process with the known labels excluded for these samples to discover sub-classes. For example, a document has a "contract" label. Then the label induction process is executed again to determine what type of contract this document is (e.g., apartment lease, mortgage disclosure, etc.). This process can be run recursively and subtypes or subclasses can be expanded if labels are hieratical in nature.

Embodiments of the present disclosure may be used in the context of document classification. For example, a document classification network based on the present disclosure may take an electronic document (e.g., Word, PDF) and efficiently identify a class for the document. An example application, according to some embodiments, is provided with reference to FIGS. 5-7. Details regarding the architecture of an example document classification apparatus are provided with reference to FIGS. 1-4. An example process for document classification is provided with reference to FIG. 8. Example training processes are described with reference to FIGS. 9-12.

Network Architecture

In FIGS. 1-4, an apparatus and method for document classification are described. One or more embodiments of the apparatus and method include a processor; a memory including instructions executable by the processor; a neural network trained to identify a plurality of known classes for a plurality of samples; a clustering component configured to cluster the plurality of samples to obtain a plurality of clusters; and an open-set metric component configured to identify a cluster of the plurality of clusters for annotation based on an open-set metric.

Some examples of the apparatus and method further include a training component configured to train the neural network based on the annotation. Some examples of the apparatus and method further include an annotation component configured to display samples of the identified cluster in an annotation interface.

Some examples of the apparatus and method further include a user interface component configured to display a customized user interface based on classification data generated by the neural network. In some examples, the neural network includes a transformer network that includes a classification head.

FIG. 1 shows an example of a document classification system according to aspects of the present disclosure. The example shown includes user 100, user device 105, document classification apparatus 110, cloud 115, and database 120. Document classification apparatus 110 is an example of, or includes aspects of, the corresponding element described with reference to FIG. 2.

As an example shown in FIG. 1, user 100 uploads a document. The document is transmitted to document classification apparatus 110, e.g., via user device 105 and cloud 115. Document classification apparatus 110 classifies the document using a neural network to obtain classification data. The neural network is trained by iteratively selecting samples for annotation with an unknown class using an open-set metric based on predicted classification data. For example, the open-set metric indicates that known classes do not characterize the set of samples to a threshold level. Hence, a new class is needed. The new class is to be discovered and added into the known labels. User device 105 displays the document via a customized user interface based on the classification data. For example, the document is associated with class "contract" and the labeled document is displayed on the user interface and shown to user 100.

User device 105 may be a personal computer, laptop computer, mainframe computer, palmtop computer, personal assistant, mobile device, or any other suitable processing apparatus. In some examples, user device 105 includes software that incorporates a document classification application. In some examples, the document classification application on user device 105 may include functions of document classification apparatus 110.

A user interface may enable user 100 to interact with user device 105. In some embodiments, the user interface may include an audio device, such as an external speaker system, an external display device such as a display screen, or an input device (e.g., remote control device interfaced with the user interface directly or through an I/O controller module). In some cases, a user interface may be a graphical user interface (GUI). In some examples, a user interface may be represented in code which is sent to the user device and rendered locally by a browser.

Document classification apparatus 110 includes a computer implemented network comprising a neural network, a clustering component, an open-set metric component, an annotation component, and a user interface component. Document classification apparatus 110 may also include a processor unit, a memory unit, an I/O module, and a training component. The training component is used to train a machine learning model (e.g., a document classification network or a classifier). Additionally, document classification apparatus 110 can communicate with database 120 via cloud 115. In some cases, the architecture of the document classification network is also referred to as a network or a network model. Further detail regarding the architecture of document classification apparatus 110 is provided with reference to FIGS. 1-4. Further detail regarding the operation of document classification apparatus 110 is provided with reference to FIGS. 5 and 8.

In some cases, document classification apparatus 110 is implemented on a server. A server provides one or more functions to users linked by way of one or more of the various networks. In some cases, the server includes a single microprocessor board, which includes a microprocessor responsible for controlling all aspects of the server. In some cases, a server uses on or more microprocessors and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general-purpose computing device, a personal computer, a laptop computer, a mainframe computer, a supercomputer, or any other suitable processing apparatus.

Cloud 115 is a computer network configured to provide on-demand availability of computer system resources, such as data storage and computing power. In some examples, cloud 115 provides resources without active management by the user. The term cloud is sometimes used to describe data centers available to many users over the Internet. Some large cloud networks have functions distributed over multiple locations from central servers. A server is designated an edge server if the server has a direct or close connection to a user. In some cases, cloud 115 is limited to a single organization. In other examples, cloud 115 is available to many organizations. In one example, cloud 115 includes a multi-layer communications network comprising multiple edge routers and core routers. In another example, cloud 115 is based on a local collection of switches in a single physical location.

Database 120 is an organized collection of data. For example, database 120 stores data in a specified format known as a schema. Database 120 may be structured as a single database, a distributed database, multiple distributed databases, or an emergency backup database. In some cases, a database controller may manage data storage and processing in database 120. In some cases, a user interacts with database controller. In other cases, database controller may operate automatically without user interaction.

Figure 2:
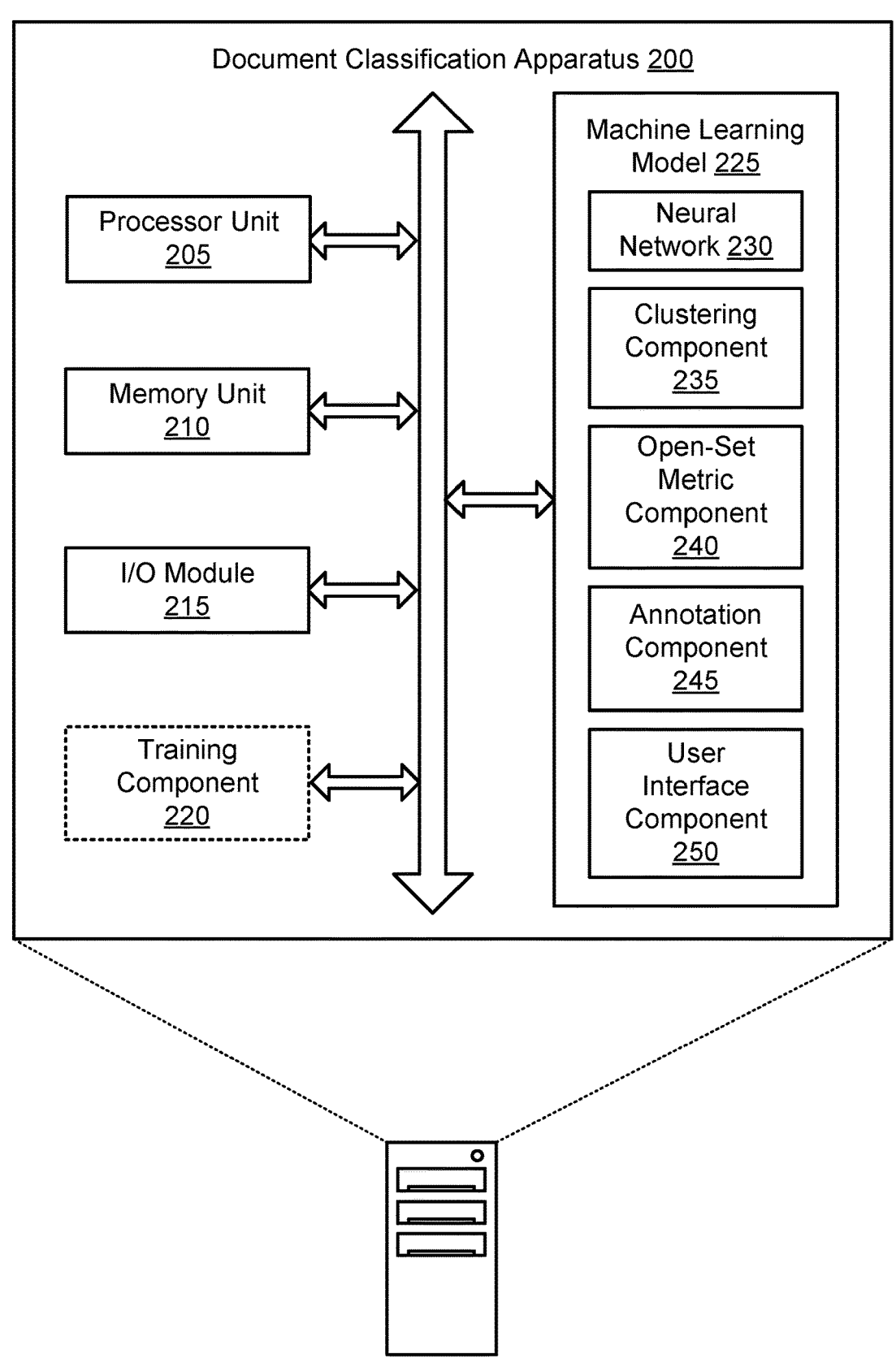
FIG. 2 shows an example of a document classification apparatus according to aspects of the present disclosure.

FIG. 2 shows an example of a document classification apparatus 200 according to aspects of the present disclosure. The example shown includes document classification apparatus 200, processor unit 205, memory unit 210, I/O module 215, training component 220, and machine learning model 225. In some embodiments, machine learning model 225 includes neural network 230, clustering component 235, open-set metric component 240, annotation component 245, and user interface component 250. Document classification apparatus 200 is an example of, or includes aspects of, the corresponding element described with reference to FIG. 1.

Processor unit 205 is an intelligent hardware device, (e.g., a general-purpose processing component, a digital signal processor (DSP), a central processing unit (CPU), a graphics processing unit (GPU), a microcontroller, an application-specific integrated circuit (ASIC), a field programmable gate array (FPGA), a programmable logic device, a discrete gate or transistor logic component, a discrete hardware component, or any combination thereof). In some cases, processor unit 205 is configured to operate a memory array using a memory controller. In other cases, a memory controller is integrated into the processor. In some cases, processor unit 205 is configured to execute computer-readable instructions stored in a memory to perform various functions. In some embodiments, processor unit 205 includes special-purpose components for modem processing, baseband processing, digital signal processing, or transmission processing.

Examples of memory unit 210 include random access memory (RAM), read-only memory (ROM), or a hard disk. Examples of memory unit 210 include solid-state memory and a hard disk drive. In some examples, memory unit 210 is used to store computer-readable, computer-executable software including instructions that, when executed, cause a processor to perform various functions described herein. In some cases, memory unit 210 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within memory unit 210 store information in the form of a logical state.

I/O module 215 (e.g., an input/output interface) may include an I/O controller. An I/O controller may manage input and output signals for a device. I/O controller may also manage peripherals not integrated into a device. In some cases, an I/O controller may represent a physical connection or port to an external peripheral. In some cases, an I/O controller may utilize an operating system such as iOS®, ANDROID®, MS-DOS®, MS-WINDOWS®, OS/2®, UNIX®, LINUX®, or another known operating system. In other cases, an I/O controller may represent or interact with a modem, a keyboard, a mouse, a touchscreen, or a similar device. In some cases, an I/O controller may be implemented as part of a processor. In some cases, a user may interact with a device via I/O controller or via hardware components controlled by an I/O controller.

In some examples, I/O module 215 includes a user interface. A user interface may enable a user to interact with a device. In some embodiments, the user interface may include an audio device, such as an external speaker system, an external display device such as a display screen, or an input device (e.g., remote-control device interfaced with the user interface directly or through an I/O controller module). In some cases, a user interface may be a graphical user interface (GUI). In some examples, a communication interface operates at the boundary between communicating entities and the channel and may also record and process communications. Communication interface is provided herein to enable a processing system coupled to a transceiver (e.g., a transmitter and/or a receiver). In some examples, the transceiver is configured to transmit (or send) and receive signals for a communications device via an antenna.

According to some embodiments of the present disclosure, document classification apparatus 200 includes a computer-implemented artificial neural network (ANN) to generate classification data for a set of samples. An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, the node processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

According to some embodiments, training component 220 trains neural network 230 to identify the unknown class based on the annotation of the set of samples. In some examples, training component 220 computes a multi-label loss based on the classification data and ground truth labels, where each of the ground truth labels describes a known class of the set of known classes. In some examples, training component 220 updates parameters of neural network 230 based on the multi-label loss.

According to some embodiments, training component 220 is configured to train neural network 230 based on the annotation. Training component 220 is an example of, or includes aspects of, the corresponding element described with reference to FIG. 4. In some examples, training component 220 is part of another apparatus other than document classification apparatus 200.

Machine learning model 225 is an example of, or includes aspects of, the corresponding element described with reference to FIG. 3. In one embodiment, machine learning model 225 includes neural network 230, clustering component 235, open-set metric component 240, annotation component 245, and user interface component 250.

According to some embodiments, neural network 230 receives an electronic document. In some examples, neural network 230 classifies the electronic document to obtain classification data, where neural network 230 is trained by iteratively selecting samples for annotation with an unknown class using an open-set metric based on predicted classification data. In some examples, neural network 230 generates the predicted classification data for a set of samples, where neural network 230 is trained to identify a set of known classes. In some examples, neural network 230 identifies a document type based on the classification data.

According to some embodiments, neural network 230 generates classification data for a set of samples, where neural network 230 is trained to identify a set of known classes. In some examples, neural network 230 generates a feature embedding corresponding to each of the set of samples, where the classification data is generated based on the feature embedding. In some examples, the classification data includes prediction logits, uncertainty measures, or both.

According to some embodiments, neural network 230 is trained to identify a set of known classes for a set of samples. In some examples, neural network 230 includes a transformer network that includes a classification head. Neural network 230 is an example of, or includes aspects of, the corresponding element described with reference to FIG. 4.

According to some embodiments, clustering component 235 clusters the set of samples to obtain a set of clusters. Clustering component 235 is an example of, or includes aspects of, the corresponding element described with reference to FIG. 4.

According to some embodiments, open-set metric component 240 selects a set of samples for annotation with the unknown class from the set of samples using the open-set metric based on the predicted classification data.

According to some embodiments, open-set metric component 240 selects a set of samples for annotation from the set of samples using an open-set metric based on the classification data, where the annotation includes an unknown class. In some examples, the open-set metric indicates that the set of known classes do not characterize the set of samples to a threshold level. In some examples, open-set metric component 240 selects a cluster from the set of clusters based on the open-set metric, where the set of samples includes samples from the cluster.

In some examples, open-set metric component 240 computes an activation logit value for each sample in the selected cluster. Open-set metric component 240 identifies a maximum activation logit value based on the activation logit value for each sample in the selected cluster, where the open-set metric is based on the maximum activation logit value. In some examples, the selected cluster minimizes the maximum activation logit value.

In some examples, open-set metric component 240 identifies a class of the set of known classes. Open-set metric component 240 excludes the class from the set of known classes to obtain a reduced set of known classes. Open-set metric component 240 computes the open-set metric based on the reduced set of known classes.

According to some embodiments, open-set metric component 240 is configured to identify a cluster of the plurality of clusters for annotation based on an open-set metric. Open-set metric component 240 is an example of, or includes aspects of, the corresponding element described with reference to FIG. 4.

According to some embodiments, annotation component 245 displays the set of samples in an annotation interface. In some examples, annotation component 245 receives annotation input via the annotation interface, where the training is based on the annotation input. In some examples, annotation component 245 identifies a shared label of the set of samples based on the annotation input, where the annotation is based on the shared label. In some examples, annotation component 245 identifies a distinguishing label of the set of samples based on the annotation input, where the annotation is based on the distinguishing label.

According to some embodiments, annotation component 245 is configured to display samples of the identified cluster in an annotation interface.

According to some embodiments, user interface component 250 displays the electronic document via a customized user interface based on the classification data. In some examples, user interface component 250 selects an interface element associated with the document type, where the customized user interface includes the interface element.

According to some embodiments, user interface component 250 is configured to display a customized user interface based on classification data generated by neural network 230.

The described methods may be implemented or performed by devices that include a general-purpose processor, a digital signal processor (DSP), an application-specific integrated circuit (ASIC), a field programmable gate array (FPGA) or other programmable logic devices, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates the transfer of code or data. A non-transitory storage medium may be any available medium that can be accessed by a computer. For example, non-transitory computer-readable media can comprise random access memory (RAM), read-only memory (ROM), electrically erasable programmable read-only memory (EE-PROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

Figure 3:
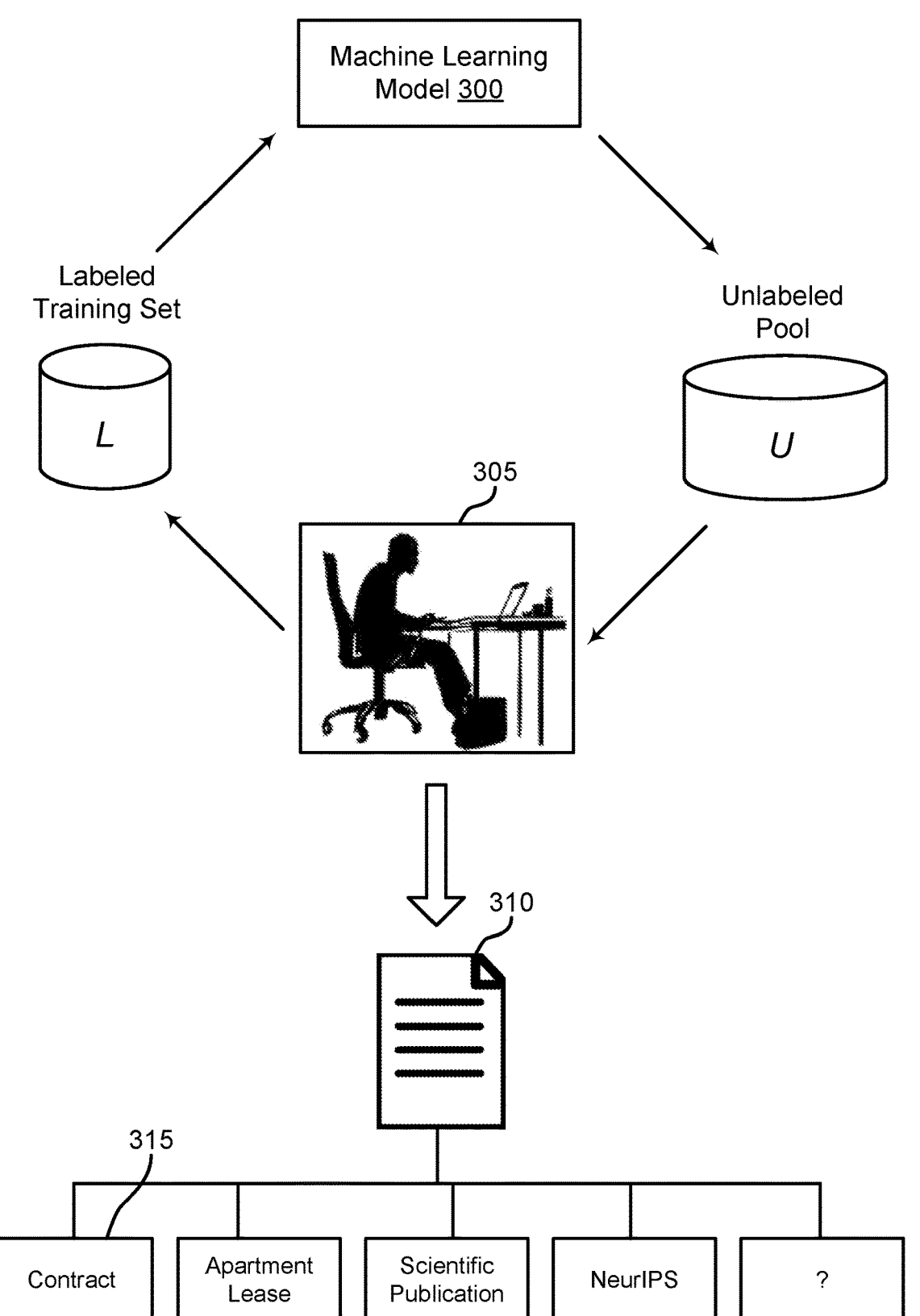
FIG. 3 shows an example of an annotating process according to aspects of the present disclosure.

FIG. 3 shows an example of an annotating process according to aspects of the present disclosure. The example shown includes machine learning model 300, annotator 305, document 310, and label 315. Machine learning model 300 is an example of, or includes aspects of, the corresponding element described with reference to FIG. 2. Document 310 is an example of, or includes aspects of, the corresponding element described with reference to FIGS. 6 and 7. Label 315 is an example of, or includes aspects of, the corresponding element described with reference to FIGS. 6 and 7.

Training a classification model may depend on a large amount of labeled training data, which can be costly and time consuming to obtain. Accordingly, active learning is used to train a machine learning model with a limited annotation budget. Active learning refers to a machine learning model that is able to select training samples to learn from. In some cases, active learning models depend on uncertainty estimates based on information theory, for designing acquisition functions for active learning. In some examples, the document classification apparatus incorporates weak labeling techniques (i.e., presenting a portion of the annotation data generated by the classification model to a human annotator) are combined with active learning. The weak labeling techniques make use of annotator feedback (e.g., annotator's label assignment or corrections) during an active learning cycle. Weak labeling is used to reduce the annotation cost.

According to an embodiment, an unlabeled pool U includes a set of samples that do not have labels (e.g., not yet assigned a label by annotator 305). A sample from the unlabeled pool U is sent to annotator 305. Annotator 305 assigns a label to the sample. Then, the sample is added into the labeled training set L. The labeled training set L is used to train machine learning model 300. For example, the labeled training set includes known label(s) 315 such as contract, apartment lease, scientific publication, and NeurIPS. Additional unknown labels are to be discovered using the annotating process. Then the additional unknown labels, once discovered, are moved from unlabeled pool U to labeled training set L.

Figure 4:
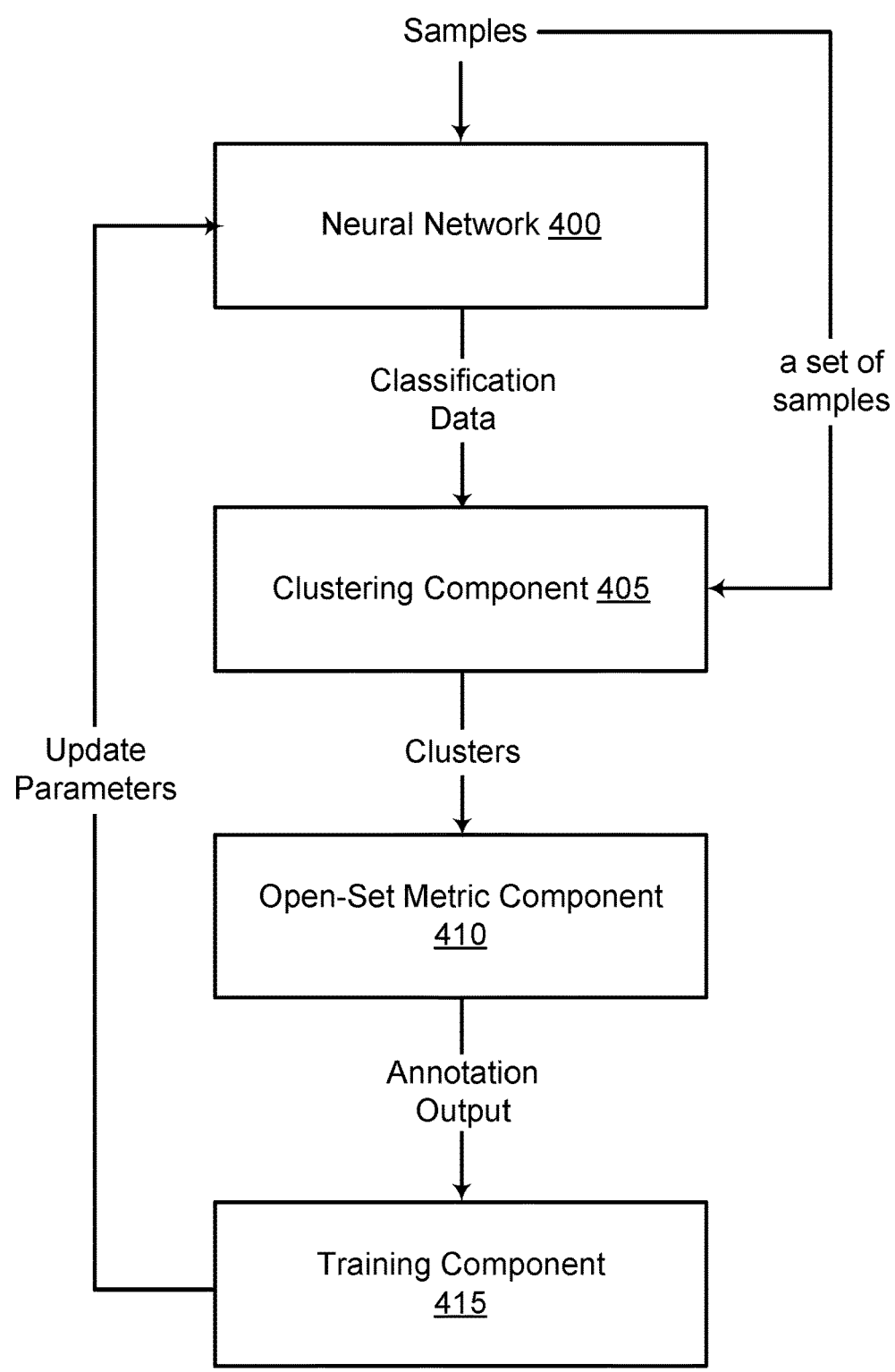
FIG. 4 shows an example of a machine learning model according to aspects of the present disclosure.

FIG. 4 shows an example of a machine learning model according to aspects of the present disclosure. The example shown includes neural network 400, clustering component 405, open-set metric component 410, and training component 415.

According to an embodiment, a set of samples is input to neural network 400. Then, neural network 400 generates classification data for the set of samples. Neural network 400 is trained to identify a set of known classes. Neural network 400 is an example of, or includes aspects of, the corresponding element described with reference to FIG. 2.

Clustering component 405 clusters the set of samples to obtain a set of clusters. Clustering component 405 is an example of, or includes aspects of, the corresponding element described with reference to FIG. 2.

Open-set metric component 410 selects a cluster from the set of clusters based on an open-set metric, where the set of samples includes samples from the cluster. Open-set metric component 410 selects one or more samples for annotation from the set of samples using the open-set metric based on the classification data, where the annotation includes an unknown class. In some examples, the open-set metric indicates that the set of known classes does not characterize the one or more samples to a threshold level. Open-set metric component 410 is an example of, or includes aspects of, the corresponding element described with reference to FIG. 2.

Training component 415 trains neural network 400 to identify the unknown class based on the annotation of the set of samples. Training component 415 is an example of, or includes aspects of, the corresponding element described with reference to FIG. 2.

Document Classification

In FIGS. 5-8, a method, apparatus, and non-transitory computer-readable medium for document classification are described. One or more embodiments of the method, apparatus, and non-transitory computer-readable medium include receiving an electronic document; classifying the electronic document using a neural network to obtain classification data, wherein the neural network is trained by iteratively selecting samples for annotation with an unknown class using an open-set metric based on predicted classification data; and displaying the electronic document via a customized user interface based on the classification data.

Some examples of the method, apparatus, and non-transitory computer-readable medium further include generating the predicted classification data for a plurality of samples using the neural network, wherein the neural network is trained to identify a plurality of known classes. Some examples further include selecting a set of samples for annotation with the unknown class from the plurality of samples using the open-set metric based on the predicted classification data. Some examples further include training the neural network to identify the unknown class based on the annotation of the set of samples.

Some examples of the method, apparatus, and non-transitory computer-readable medium further include identifying a document type based on the classification data. Some examples further include selecting an interface element associated with the document type, wherein the customized user interface includes the interface element.

Figure 5:
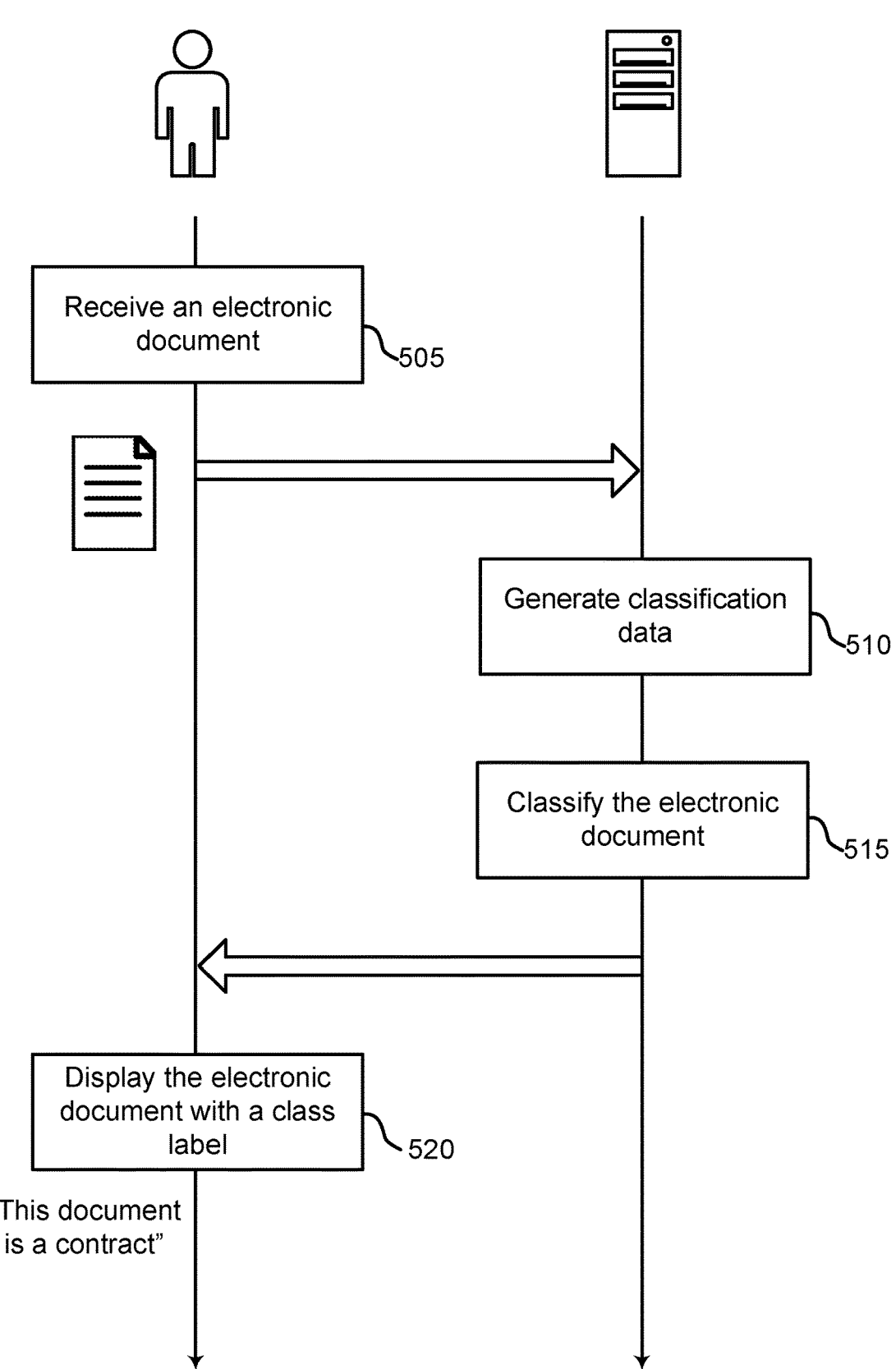
FIG. 5 shows an example of document classification according to aspects of the present disclosure.

FIG. 5 shows an example of document classification process according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 505, the system receives an electronic document from a user. In some cases, the operations of this step refer to, or may be performed by, a user as described with reference to FIG. 1. In some cases, the operations of this step refer to, or may be performed by, a document classification apparatus as described with reference to FIGS. 1 and 2.

At operation 510, the system generates classification data based on the electronic document. In some cases, the operations of this step refer to, or may be performed by, a document classification apparatus as described with reference to FIGS. 1 and 2.

At operation 515, the system classifies the electronic document based on the classification data. In some cases, the operations of this step refer to, or may be performed by, a document classification apparatus as described with reference to FIGS. 1 and 2.

At operation 520, the system displays the electronic document with a class label. In some embodiments, the system displays the electronic document with a class label "contract" or the phrase "this document is a contract" to the user via user interface. In some cases, the operations of this step refer to, or may be performed by, a user interface component as described with reference to FIG. 2. For example, the class label is "contract" for the document.

Figure 6:
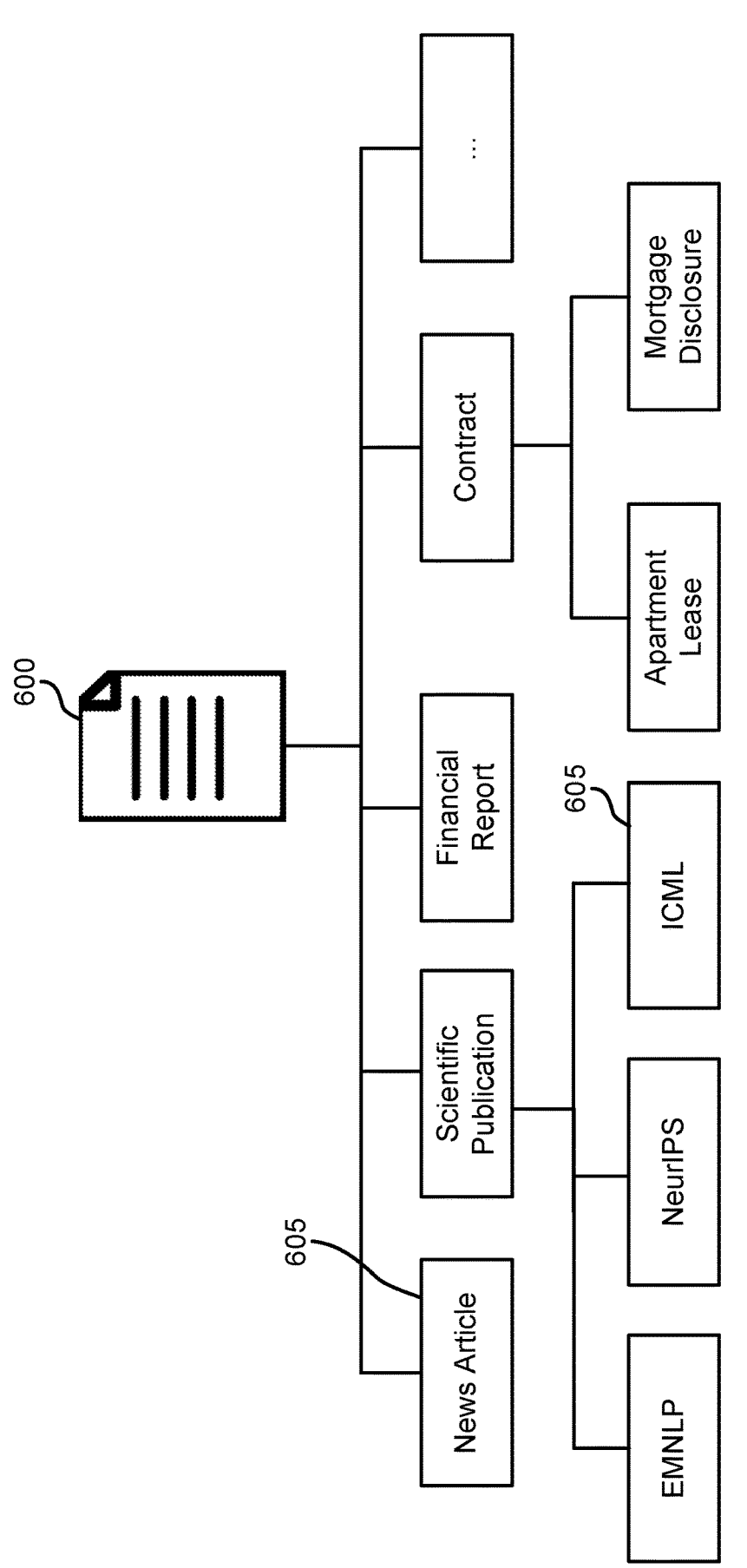
FIG. 6 shows an example of document classification diagram according to aspects of the present disclosure.

FIG. 6 shows an example of document classification diagram according to aspects of the present disclosure. The example shown includes document 600 and label 605. As an example shown in FIG. 6, the label space may be hierarchical. In some cases, the label space includes main class and sub-classes. For example, the labels "apartment lease" and "mortgage disclosure" are sub-classes of "contract. Similarly, labels "EMNLP", "NeurIPS", and "ICML" are sub-classes of "scientific publication". In some examples, machine learning model 225 as in FIG. 2 can be used to identify a class for document 600. Machine learning model 225 can also be used to expand the existing label space (e.g., continue to refine the discovered topics or expand the label types).

Document 600 is an example of, or includes aspects of, the corresponding element described with reference to FIGS. 3 and 7. Label 605 is an example of, or includes aspects of, the corresponding element described with reference to FIGS. 3 and 7.

Figure 7:
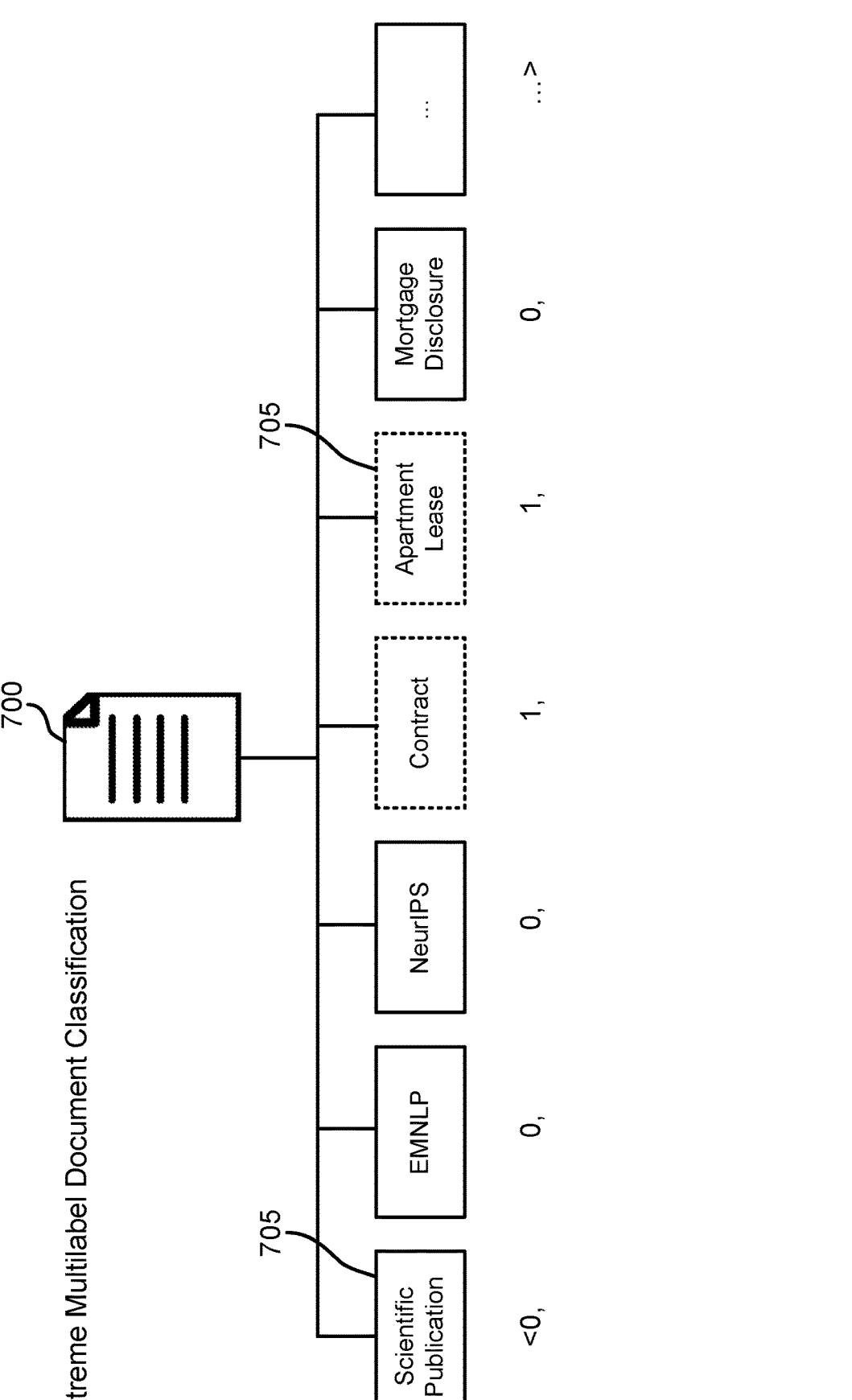
FIG. 7 shows an example of multi-label document classification according to aspects of the present disclosure.

FIG. 7 shows an example of multi-label document classification according to aspects of the present disclosure. The example shown includes document 700 and label 705. FIG. 7 relates to multi-label document classification. For example, document 700 is associated with multiple labels, e.g., contract and apartment lease. Here, a label or class with a score of "1" indicates that the label or class is associated with document 700. On the other hand, a score of "0" indicates that the corresponding label or class is not associated with document 700.

Document 700 is an example of, or includes aspects of, the corresponding element described with reference to FIGS. 3 and 6. Label 705 is an example of, or includes aspects of, the corresponding element described with reference to FIGS. 3 and 6.

FIG. 8 shows an example of a method for document classification according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 805, the system receives an electronic document. In some cases, the operations of this step refer to, or may be performed by, a neural network as described with reference to FIGS. 2 and 4. In some examples, a neural network receives one or more electronic documents (e.g., PDF documents) for classification.

At operation 810, the system classifies the electronic document using a neural network to obtain classification data, where the neural network is trained by iteratively selecting samples for annotation with an unknown class using an open-set metric based on predicted classification data. In some cases, the operations of this step refer to, or may be performed by, a neural network as described with reference to FIGS. 2 and 4.

According to an embodiment of the present disclosure, a training component of document classification apparatus 200 (shown in FIG. 2) includes selecting a set of samples for annotation using an open-set metric that identifies ambiguous samples. For example, one label induction method relates to picking samples that have the least activation responses to known classes (e.g., all known classes). These samples would be identified and annotated with a previously unknown class. This enables a robust multi-label classifier that can handle a much larger pool of labels.

According to an embodiment, document classification apparatus 200 constructs a document type classification model where the labels to be predicted are unknown at the beginning of the process. These unknown labels are iteratively discovered with a human-in-the-loop driven by choosing data to be labeled based on the current state of a supervised, trained classifier. Document classification apparatus 200 uses a supervised deep multi-label classification model to discover new classes. Document classification apparatus 200 builds a classifier and expands the label space by selecting samples that are either uncertain or have low activation. Discovering hieratical or sub-classes using a top-down iterative expansion or comparative labeling will be described in greater detail in FIGS. 11 and 12.

The present disclosure includes a human-in-the-loop system and methods for efficiently building a set of classes or attributes when the space of labels is unknown. In some cases, the process may be referred to as label induction. In the present disclosure, a class represents a specific type or attribute to describe content, e.g., cat, dog, contract, house, etc. A known class is a class that exists in the known dataset. On the other hand, unknown class is a class that has yet to be defined or discovered by the user. Labeled sample represents a data sample assigned to a class (e.g., class is given). In some cases, data samples may have multiple labels. On the other hand, an unlabeled sample is a data sample that has not been assigned any labels by an annotator (e.g., a human in the active learning loop).

In some cases, a dataset has one or more "known" classes of interest. However, an initial clustering can be substituted where the user annotates a few samples as a "cold start". For example, a cold start situation exists when a new dataset contains no classes (e.g., labeled space is null). In some cases, there is a large amount of unlabeled data with unknown classes or unknown attributes. These data may be preprocessed to remove duplicates and near duplicates using message-digest algorithm 5 (MD5) hashes or content similarity hashing (i.e., locality-sensitive hashing or LSH).

At operation 815, the system displays the electronic document via a customized user interface based on the classification data. In some cases, the operations of this step refer to, or may be performed by, a user interface component as described with reference to FIG. 2. In some examples, the electronic document is displayed in a customized interface based on the document type.

Training and Evaluation

In FIGS. 9-12, a method, apparatus, and non-transitory computer-readable medium for document classification are described. One or more embodiments of the method, apparatus, and non-transitory computer-readable medium include generating classification data for a plurality of samples using a neural network trained to identify a plurality of known classes; selecting a set of samples for annotation from the plurality of samples using an open-set metric based on the classification data, wherein the annotation includes an unknown class; and training the neural network to identify the unknown class based on the annotation of the set of samples.

Some examples of the method, apparatus, and non-transitory computer readable medium further include computing a multi-label loss based on the classification data and ground truth labels, wherein each of the ground truth labels describes a known class of the plurality of known classes. Some examples further include updating parameters of the neural network based on the multi-label loss.

Some examples of the method, apparatus, and non-transitory computer readable medium further include generating a feature embedding corresponding to each of the plurality of samples using the neural network, wherein the classification data is generated based on the feature embedding. In some examples, the classification data includes prediction logits, uncertainty measures, or both.

In some examples, the open-set metric indicates that the plurality of known classes does not characterize the set of samples to a threshold level. Some examples of the method, apparatus, and non-transitory computer-readable medium further include clustering the plurality of samples to obtain a plurality of clusters. Some examples further include selecting a cluster from the plurality of clusters based on the open-set metric, wherein the set of samples includes samples from the cluster.

Some examples of the method, apparatus, and non-transitory computer-readable medium further include computing an activation logit value for each sample in the selected cluster. Some examples further include identifying a maximum activation logit value based on the activation logit value for each sample in the selected cluster, wherein the open-set metric is based on the maximum activation logit value. In some examples, the selected cluster minimizes the maximum activation logit value.

Some examples of the method, apparatus, and non-transitory computer-readable medium further include identifying a class of the plurality of known classes. Some examples further include excluding the class from the plurality of known classes to obtain a reduced set of known classes. Some examples further include computing the open-set metric based on the reduced set of known classes.

Some examples of the method, apparatus, and non-transitory computer-readable medium further include displaying the set of samples in an annotation interface. Some examples further include receiving annotation input via the annotation interface, wherein the training is based on the annotation input.

Some examples of the method, apparatus, and non-transitory computer-readable medium further include identifying a shared label of the set of samples based on the annotation input, wherein the annotation is based on the shared label.

Some examples of the method, apparatus, and non-transitory computer-readable medium further include identifying a distinguishing label of the set of samples based on the annotation input, wherein the annotation is based on the distinguishing label.

FIG. 9 shows an example of a method for training a neural network according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Supervised learning is one of three basic machine learning paradigms, alongside unsupervised learning and reinforcement learning. Supervised learning is a machine learning technique based on learning a function that maps an input to an output based on example input-output pairs. Supervised learning generates a function for predicting labeled data based on labeled training data consisting of a set of training examples. In some cases, each example is a pair consisting of an input object (typically a vector) and a desired output value (i.e., a single value, or an output vector). A supervised learning algorithm analyzes the training data and produces the inferred function, which can be used for mapping new examples. In some cases, the learning results in a function that correctly determines the class labels for unseen instances. In other words, the learning algorithm generalizes from the training data to unseen examples.

Accordingly, during the training process, the parameters and weights of the machine learning model described in the present disclosure are adjusted to increase the accuracy of the result (i.e., by attempting to minimize a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

The term "loss function" refers to a function that impacts how a machine learning model is trained in a supervised learning model. Specifically, during each training iteration, the output of the model is compared to the known annotation information in the training data. The loss function provides a value for how close the predicted annotation data is to the actual annotation data. After computing the loss function, the parameters of the model are updated accordingly and a new set of predictions are made during the next iteration.

At operation 905, the system generates classification data for a set of samples using a neural network trained to identify a set of known classes. In some cases, the operations of this step refer to, or may be performed by, a neural network as described with reference to FIGS. 2 and 4. According to an embodiment of the present disclosure, the training component is configured to train neural network 230 (shown in FIG. 2) using a multi-label loss (e.g., binary cross entropy "BCE"). The neural network is trained using a dataset of "known" classes. Embodiments of the present disclosure are not limited to a particular type of machine learning model as long as the neural network includes a classification head. In some examples, a fine-tuned Bidirectional Encoder Representations from Transformers (BERT) is used for text classification. In another example, a multimodal model is fine-tuned for document images.

In some cases, neural network 230 is run across an unlabeled dataset saving the prediction logits and feature embeddings from the classifier.

At operation 910, the system selects a set of samples for annotation from the set of samples using an open-set metric based on the classification data, where the annotation includes an unknown class. In some cases, the operations of this step refer to, or may be performed by, an open-set metric component as described with reference to FIGS. 2 and 4.

According to an embodiment, training involves the following steps. Step one is initializing simulation, e.g., randomly sample 100 documents and annotate them according to initial 10 classes. Step two is sampling data for known classes, e.g., choose 5 known classes and use active learning to label 100 documents for each class. Step three is sampling data to induce unknown classes, e.g., choose 5 clusters of 100 documents and induce new label for each cluster. Step four is training the model on labeled data and evaluate performance. Step five is repeating steps two to four for 50 cycles.

According to an embodiment, the training component selects X data samples for human labeling which increase the performance of the classifier for known classes. As a result, the most uncertain samples are selected. While doing label induction, the training component continuously improves the model for known classes to ensure stable training.

According to an embodiment, the training component selects samples x* using the following equation. However, embodiments of the present disclosure may use other uncertainty based active learning methods to select samples:

$$x^* = \arg\min_{x \in X} \max_{y \in Y} |p(y \mid x) - 0.5| \qquad (1)$$

where X is the set of examples, Y is the set of known classes and p(y|x) is the model label predictions from the multi-label BCE loss. Details regarding computing an open-set metric will be described with regards to FIG. 10.

At operation 915, the system trains the neural network to identify the unknown class based on the annotation of the set of samples. In some cases, the operations of this step refer to, or may be performed by, a training component as described with reference to FIGS. 2 and 4. One or more embodiments of the present disclosure includes a document classification apparatus that can efficiently construct a rich document type classification model via training for a domain where the labels to be predicted are unknown at the beginning of the process.

The present disclosure includes methods that seamlessly integrate classifier development with data labeling and discovery of new labels. One or more embodiments of the present disclosure has an annotator (e.g., human-in-the-loop) that efficiently generates and organizes the rich type of label space driven by the current state of the model. Here, the label space is unknown a priori and can continue to increase the accuracy of the discovered topics to refine or expand the label types. Example experiments and evaluation demonstrate that the document classification apparatus described in the present disclosure can construct a rich document type classification model via learning. In some cases, the document classification model can be used for document cloud analytics.

One or more embodiments of the present disclosure can be used when a new classification model is needed, but its taxonomy or label space is unknown. In addition to document type classification, the present disclosure can be used in image tagging, object tagging, video tagging and actions, documents type tagging, clause tagging, and entity tagging, where there is a large but partially known label space (e.g., some labels are unknown). One or more embodiments of the present disclosure can also be used by users who share a large volume of data with an online service provider and need fine-tuned models, but where the tag space is partially unknown.

According to an embodiment, the document classification apparatus efficiently constructs a robust classifier in domains where the label space is not known and is configured to perform label induction in multi-label settings. The document classification apparatus depends on a supervised deep multi-label classification model to drive new class discovery. The document classification apparatus also depends on human-in-the-loop algorithm for jointly building a classifier while expanding the label space by selecting examples that are either uncertain or have low activation. The document classification apparatus can discover hierarchical or subclasses using a top-down iterative expansion or comparative labeling.

FIG. 10 shows an example of a method for computing an open-set metric according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1005, the system clusters the set of samples to obtain a set of clusters. In some cases, the operations of this step refer to, or may be performed by, a clustering component as described with reference to FIGS. 2 and 4.

According to an embodiment, the clustering component is used to prepare for performing the label induction to select samples that help build classifiers for unknown classes. The training component clusters the data into K clusters using the model feature embeddings. The training component may add a second set of clusters to the set using a pre-trained model (e.g., SentenceBERT, UniDoc, etc.). In some examples, K-center clustering is used to identify or determine outlier clusters.

At operation 1010, the system selects a cluster from the set of clusters based on the open-set metric, where the set of samples includes samples from the cluster. In some cases, the operations of this step refer to, or may be performed by, an open-set metric component as described with reference to FIGS. 2 and 4.

At operation 1015, the system computes an activation logit value for each sample in the selected cluster. In some cases, the operations of this step refer to, or may be performed by, an open-set metric component as described with reference to FIGS. 2 and 4. The training component selects the top clusters for annotation using an open-set metric. In one or more embodiments of the present disclosure, the following open-set metric measure is used for multi-label settings. The open-set metric includes picking logits with the lowest activation across all the known classes:

$$x^* = \arg\min_{x \in X} \max_{y \in Y} p(y \mid x) \qquad (2)$$

Embodiments of the present disclosure are not limited to the open-set metric measure mentioned herein. The training component enables an annotator to label and determine whether or not the examples chosen in the above steps belong to a single class type. The training component performs the aforementioned training process for a set number of steps or until the model has low uncertainty and low open-set metric measures for the unlabeled datasets.

At operation 1020, the system identifies a maximum activation logit value based on the activation logit value for each sample in the selected cluster, where the open-set metric is based on the maximum activation logit value. In some cases, the operations of this step refer to, or may be performed by, an open-set metric component as described with reference to FIGS. 2 and 4.

Figure 11:
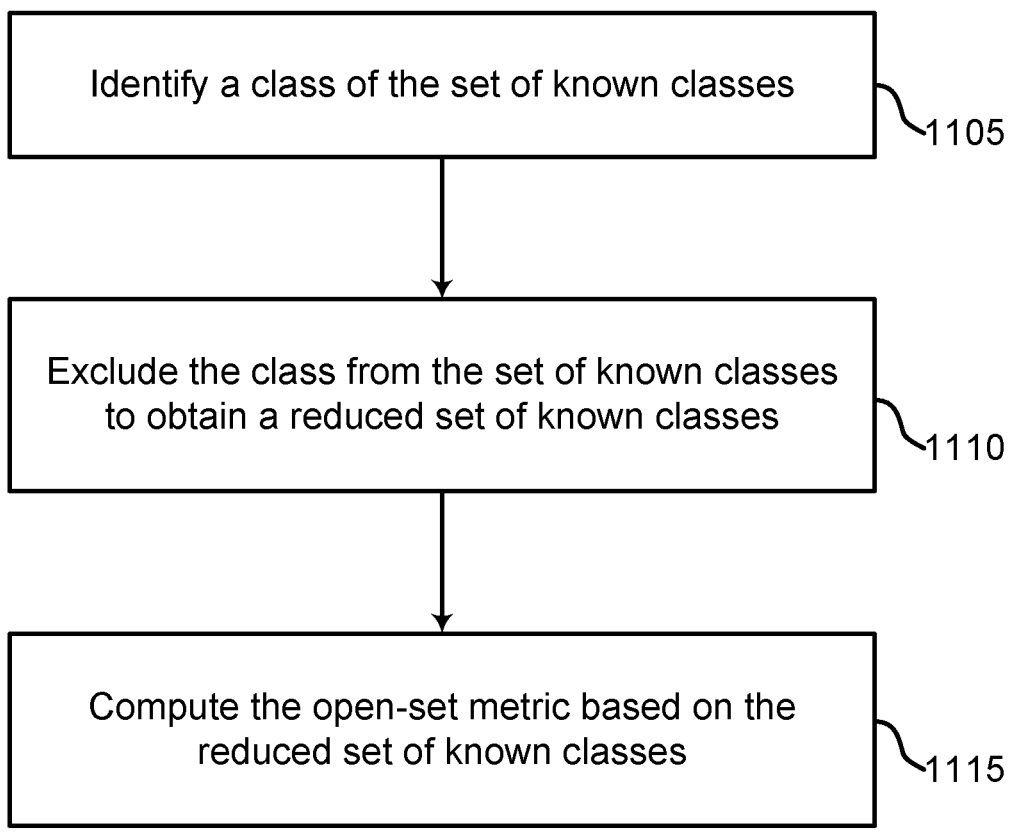
Figure 12:
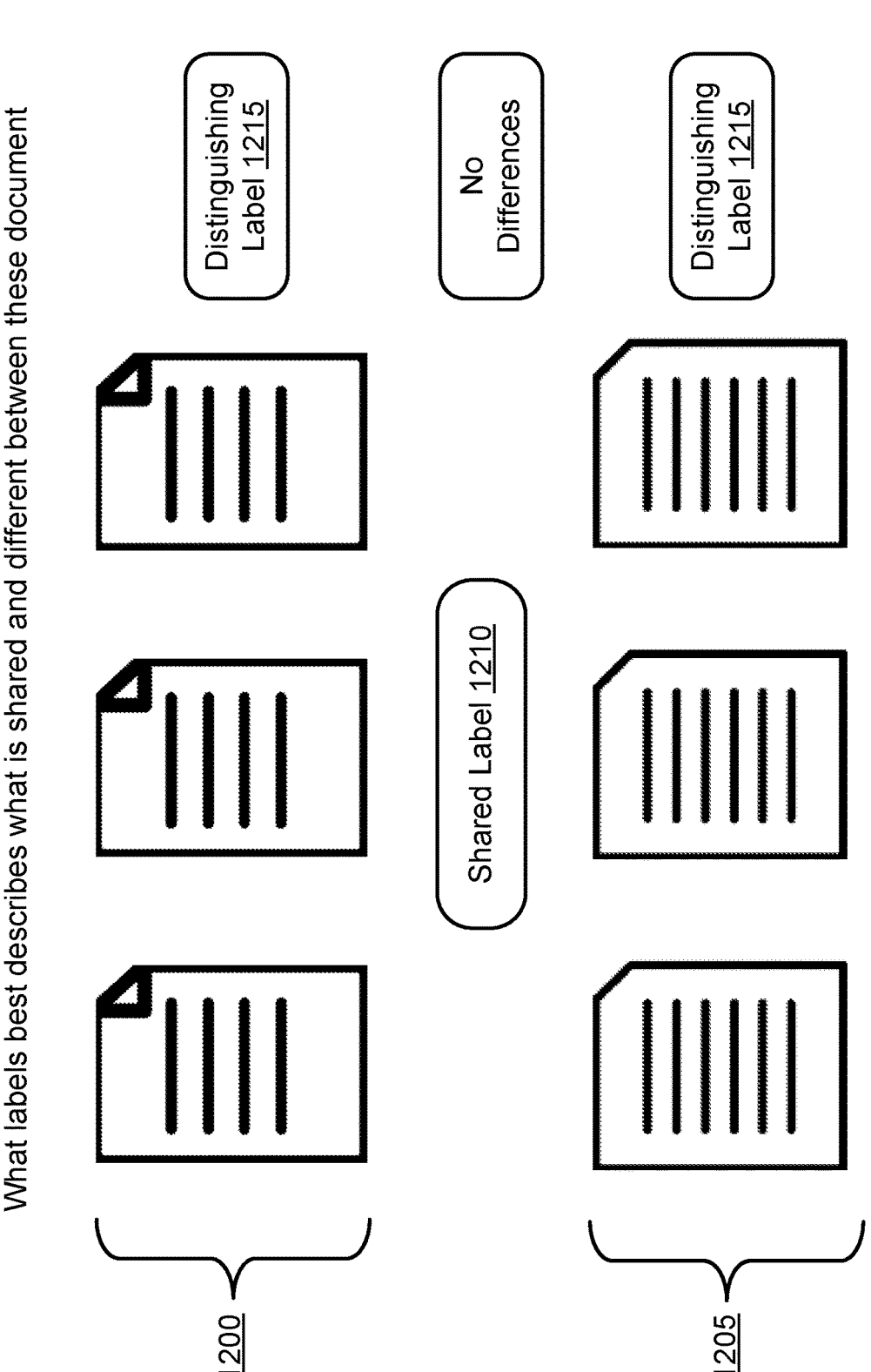
FIG. 12 shows an example of user interface for comparative labeling according to aspects of the present disclosure.

FIGS. 11 and 12 relate to extending label induction for hierarchical labels. FIG. 11 shows an example of a method for computing an open-set metric according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1105, the system identifies a class of the set of known classes. In some cases, the operations of this step refer to, or may be performed by, an open-set metric component as described with reference to FIGS. 2 and 4. Document classification apparatus 200 (as shown in FIG. 2) can be used for multi-label settings with a flat hierarchy. Additionally or alternatively, document classification apparatus 200 can elicit more specific or hierarchical labels. For example, golden retriever is a sub-class of class "dog".

At operation 1110, the system excludes the class from the set of known classes to obtain a reduced set of known classes. In some cases, the operations of this step refer to, or may be performed by, an open-set metric component as described with reference to FIGS. 2 and 4. In the above example, the open-set metric component excludes the class "dog" from the set of known classes to obtain a reduced set of known classes.

At operation 1115, the system computes the open-set metric based on the reduced set of known classes. In some cases, the operations of this step refer to, or may be performed by, an open-set metric component as described with reference to FIGS. 2 and 4.

According to an embodiment, machine learning model 225 (as shown in FIG. 2) runs top-down iterative class expansion. After running the current classifier for labeled classes on the unlabeled dataset, a user can choose the class with the largest number of predicted samples and run the label induction process with the known label(s) excluded for these samples to discover sub-classes. In another example, in document type classification, a document has a label "contract". Then the label induction process is re-run to ask what type of contract the document is (e.g., a subclass of contract). This process can be run recursively and subtypes can be expanded if labels are hieratical in nature.

FIG. 12 shows an example of user interface for comparative labeling according to aspects of the present disclosure. The example shown includes first document 1200, second document 1205, shared label 1210, and distinguishing label 1215. According to an embodiment of the present disclosure, a process for comparative labeling is described where instead of the user being asked for a label for one document, a user is given two documents (e.g., first document 1200, second document 1205). The user is asked for a label that both documents share and a label that distinguishes the two documents, i.e., shared label 1210 and distinguishing label 1215, respectively.

For example, given two contract documents, the user may indicate shared label 1210 as contracts, and distinguishing label 1215 as "non-disclosure agreement" (on the top) and distinguishing label 1215 as "sales agreement" (at the bottom). The training component samples points from a known class cluster and chooses the closest samples in an embedding space that have different labels or chooses the largest cluster for a given label and samples point-pairs that have not been previously sampled that are farthest in space.

Performance of apparatus, systems and methods of the present disclosure have been evaluated, and results indicate embodiments of the present disclosure have obtained increased performance over existing technology. Example experiments demonstrate that the document classification apparatus described in the present disclosure outperforms conventional systems.

Methods and apparatus described in the present disclosure are evaluated through simulation experiments on existing datasets (Eurlex-4K and AmazonCat-13K) for extreme-multilabel classification, where there are thousands of classes and each example can have multiple labels. These datasets have adopted Precision@K measures per sample where a sample gets credit if the most confidently predicted. For this experiment the P@1 measure is used, which rewards a system for finding new labels that it can accurately predict.

In the simulation, a BERT classifier is initialized with 100 examples and 10 known classes and compare to baseline for that use only uncertainty (i.e., standard active learning) or random selection (a strong baseline for active learning). The document classification apparatus is run for 50 cycles where at each step the apparatus can sample examples for 5 known classes and 5 unknown classes. The document classification apparatus results in a much higher P@1 measure over time as the cycles continue when compared to baseline approaches. The Random cluster selection can be thought of as topic modeling or cluster discover and the uncertainty baselines is conventional active learning on clusters. As the cycles increase, the document classification apparatus finds more positive examples in the examples that are samples during the unknown class discovery.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

In this disclosure and the following claims, the word "or" indicates an inclusive list such that, for example, the list of X, Y, or Z means X or Y or Z or XY or XZ or YZ or XYZ. Also, the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:
receiving an electronic document;
classifying the electronic document using a neural network to obtain classification data, wherein the neural network is trained by:
creating, in a first training cycle, a first training set based on a plurality of known classes;
training, in the first training cycle, the neural network to classify data according to the plurality of known classes based on the first training set;
creating, in a second training cycle, a second training set by generating classification data including activation values for a plurality of samples across the plurality of known classes using the neural network, clustering the plurality of samples to obtain a plurality of clusters, selecting a cluster of samples from the plurality of clusters using an open-set metric that identifies the cluster of samples with lowest activation values across the plurality of known classes, annotating the selected cluster of samples with a new label corresponding to an unknown class, and including the selected cluster of samples with the new label corresponding to the unknown class in the second training set; and
training, in the second training cycle, the neural network to classify data according to the unknown class based on the second training set; and displaying the electronic document via a customized user interface based on the classification data.

2. The method of claim 1, further comprising:
identifying a document type based on the classification data; and
selecting an interface element associated with the document type, wherein the customized user interface includes the interface element.

3. A method comprising:
creating, in a first training cycle, a first training set based on a plurality of known classes;
training, in the first training cycle, a neural network to classify data according to the plurality of known classes based on the first training set;
creating, in a second training cycle, a second training set by generating classification data including activation values for a plurality of samples across the plurality of known classes using the neural network, clustering the plurality of samples to obtain a plurality of clusters, selecting a cluster of samples from the plurality of clusters using an open-set metric that identifies the cluster of samples with lowest activation values across the plurality of known classes, annotating the selected cluster of samples with a new label corresponding to an unknown class, and including the selected cluster of samples with the new label corresponding to the unknown class in the second training set; and
training, in the second training cycle, the neural network to classify data according to the unknown class based on the second training set.

4. The method of claim 3, further comprising:
computing a multi-label loss based on the classification data and ground truth labels, wherein each of the ground truth labels describes a known class of the plurality of known classes; and
updating parameters of the neural network based on the multi-label loss.

5. The method of claim 3, further comprising:
generating a feature embedding corresponding to each of the plurality of samples using the neural network, wherein the classification data is generated based on the feature embedding.

6. The method of claim 3, wherein:
the classification data includes prediction logits, uncertainty measures, or both.

7. The method of claim 3, wherein:
the open-set metric indicates that the plurality of known classes do not characterize the cluster of samples to a threshold level.

8. The method of claim 3, further comprising:
computing an activation logit value for each sample in the selected cluster; and
identifying a maximum activation logit value based on the activation logit value for each sample in the selected cluster, wherein the open-set metric is based on the maximum activation logit value.

9. The method of claim 8, wherein:
the selected cluster minimizes the maximum activation logit value.

10. The method of claim 3, further comprising:
identifying a class of the plurality of known classes;
excluding the class from the plurality of known classes to obtain a reduced set of known classes; and
computing the open-set metric based on the reduced set of known classes.

11. The method of claim 3, further comprising:

displaying the cluster of samples in an annotation interface; and receiving annotation input via the annotation interface, wherein the training is based on the annotation input.

12. The method of claim 11, further comprising:

identifying a shared label of the cluster of samples based on the annotation input, wherein the annotation is based on the shared label.

13. The method of claim 11, further comprising:

identifying a distinguishing label of the cluster of samples based on the annotation input, wherein the annotation is based on the distinguishing label.

14. An apparatus comprising:

a processor;

a memory including instructions executable by the processor to perform operations comprising:

receiving an electronic document;

classifying the electronic document using a neural network to obtain classification data, wherein the neural network is trained by:

creating, in a first training cycle, a first training set based on a plurality of known classes;

training, in the first training cycle, the neural network to classify data according to the plurality of known classes based on the first training set;

creating, in a second training cycle, a second training set by generating classification data including activation values for a plurality of samples across the plurality of known classes using the neural network, clustering the plurality of samples to obtain a plurality of clusters, selecting a cluster of samples from the plurality of clusters using an open-set metric that identifies the cluster of samples with lowest activation values across the plurality of known classes, annotating the selected cluster of samples with a new label corresponding to an unknown class, and including the selected cluster of samples with the new label corresponding to the unknown class in the second training set; and training, in the second training cycle, the neural network to classify data according to the unknown class based on the second training set; and displaying the electronic document via a customized user interface based on the classification data.

15. The apparatus of claim 14, further comprising:

a training component configured to train the neural network based on the annotation.

16. The apparatus of claim 14, further comprising:

an annotation component configured to display the selected cluster of samples in an annotation interface.

17. The apparatus of claim 14, further comprising:

a user interface component configured to display the customized user interface based on the classification data generated by the neural network.

18. The apparatus of claim 14, wherein:

the neural network includes a transformer network that includes a classification head.

* * * * *